(12) United States Patent
Nomura et al.

(10) Patent No.: US 7,157,874 B2
(45) Date of Patent: Jan. 2, 2007

(54) ELECTRIC POWER STEERING DEVICE

(75) Inventors: Yasuhide Nomura, Maebashi (JP); Hirokazu Abe, Maebashi (JP); Kazuhiro Kumaido, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/339,653

(22) Filed: Jan. 25, 2006

(65) Prior Publication Data

US 2006/0181819 A1    Aug. 17, 2006

(30) Foreign Application Priority Data

Jan. 28, 2005    (JP) ............................ 2005-020660

(51) Int. Cl.
*H02P 7/00* (2006.01)
*B62D 6/00* (2006.01)

(52) U.S. Cl. ...................... 318/432; 318/434; 318/599

(58) Field of Classification Search ................ 318/432, 318/434, 599
See application file for complete search history.

(56) References Cited

U.S. PATENT DOCUMENTS

| | | | | |
|---|---|---|---|---|
| 5,039,926 | A * | 8/1991 | Morishita et al. | 318/434 |
| 5,552,684 | A * | 9/1996 | Wada et al. | 318/293 |
| 5,889,376 | A * | 3/1999 | Takatsuka et al. | 318/434 |
| 6,373,217 | B1 * | 4/2002 | Kawada et al. | 318/564 |
| 6,381,528 | B1 * | 4/2002 | Kawada et al. | 701/41 |
| 6,448,728 | B1 * | 9/2002 | Noro et al. | 318/433 |
| 6,696,807 | B1 * | 2/2004 | Iwata et al. | 318/432 |
| 6,808,043 | B1 * | 10/2004 | Kawada et al. | 180/446 |
| 6,837,331 | B1 * | 1/2005 | Kawada et al. | 180/446 |
| 6,943,512 | B1 * | 9/2005 | Kobayashi | 318/432 |
| 7,002,313 | B1 * | 2/2006 | Kawada | 318/564 |
| 2005/0179428 | A1 * | 8/2005 | Hiramine et al. | 324/177 |
| 2005/0258796 | A1 * | 11/2005 | Kusaka | 318/801 |

FOREIGN PATENT DOCUMENTS

| JP | 63240467 | * | 10/1988 |
|---|---|---|---|
| JP | 08-091239 A | | 4/1996 |
| JP | 2003-237605 A | | 8/2003 |

* cited by examiner

*Primary Examiner*—Rita Leykin
(74) *Attorney, Agent, or Firm*—Sidley Austin LLP

(57) ABSTRACT

An electric power steering device comprising a control unit capable of distinguishing a failure of a motor current detection device caused by a change in power voltage, an oxide film formed on the commutator of a motor or the contact point of a relay, etc. from a failure of the motor current detection device itself and judging a failure of the motor current detection device accurately. A motor current is sampled during which a predetermined constant voltage is supplied to the motor, and the detected motor current value is compared with a motor current estimated value to judge the failure of the motor current detection device.

10 Claims, 9 Drawing Sheets

ELECTRIC POWER STEERING DEVICE

BACKGROUND OF THE INVENTION

1. Field of the Invention

The present invention relates to an electric power steering device and, particularly, to an electric power steering device capable of detecting a failure of its motor current detection device.

2. Description of the Prior Art

An electric power steering device for vehicles detects steering torque generated in a steering shaft by the operation of a steering wheel and car speed, and drives a motor based on the detection signal to assist the steering force of the steering wheel. This electric power steering device is controlled by an electronic control unit. As for its control mechanism, the level of current to be supplied to the motor is calculated based on steering torque detected by a torque sensor and car speed detected by a car speed sensor.

That is, the electronic control unit controls the current to be supplied to the motor based on the steering torque and the car speed so that large steering assist force is supplied when the car speed is low, while steering torque is generated is zero or low and small steering assist force is supplied when the detected car speed is high, thereby making it possible to provide the optimum steering assist force corresponding to the running state of the vehicle.

Feed-back control is carried out so that the actual motor current through the motor becomes the motor current command value calculated based on the steering torque and the car speed. Therefore, this type of device comprises a motor current detection device for detecting an actual current through the motor.

If the above motor current detection device fails, an accurate motor current cannot be measured. As a result, motor current larger than the required current flows through the motor to supply excessive steering assist force, or that a required current does not flow through the motor, making it impossible to supply sufficient steering assist force.

Further, if the motor incorrectly rotates when the operation of the faulty motor current detection device is checked, the steering wheel linked to the motor shaft through the steering mechanism may incorrectly rotate, whereby an accident may occur.

As a solution to this problem, the applicant proposes a failure judging device for judging a failure of the motor current detection device based on a motor current estimated value when a low voltage is supplied to the above motor for a time much larger than the electric time constant of the motor and much smaller than the mechanical time constant of the motor and a motor current value detected by the motor current detection device (Japanese Laid Open Patent Publication H08-91239 (91239/1996)).

The above failure judging device judges a failure by supplying a low voltage to the motor for a limited time just after the start of the engine by turning on an ignition key, that is, for a time much larger than the electric time constant of the motor and much smaller than the mechanical time constant of the motor. This is necessary to prevent an unexpected accident which is caused by the abrupt turning of the steering wheel when the motor rotates just after the start of the engine.

However, although no failure occurs when the motor is new, after the motor is used for a certain period of time, an oxide film having electrical insulating properties forms on the contact surface between the commutator and brush of the motor and becomes thick as time elapses, thereby increasing electric resistance. As a result, unless a higher voltage is supplied to the motor, a current does not flow through the motor.

In this case, when a low voltage is supplied to the motor for a short time in order to judge a failure, a motor current is not detected or a small value is detected due to the oxide film formed on the contact surface between the commutator and the brush. Therefore, it may be misjudged that the motor current detection device has failed.

To solve this problem, the applicant proposes a failure judging device for judging a failure of the motor current detection device by setting a motor current command value for a time much larger than the electric time constant of the motor and much smaller than the mechanical time constant of the motor, changing a motor current control value based on the motor current command value as time elapses and comparing a motor current estimated value with a motor current detection value detected by the motor current detection device while increasing motor supply voltage from a low voltage as time elapses (Japanese laid Open Patent Publication 2003-237605 (237605/2003)).

However, in this failure judging device for detecting a failure of the motor current detection device, the timing of sampling a motor current is set just before the application of voltage to the motor is stopped.

Therefore, normal voltage is supplied to the motor, and the motor current detected value is normal and higher than the threshold value for judging a failure. If the motor supply voltage drops for some reason or other just before the motor supply voltage is stopped, the sampled motor current detection value falls below the threshold value for judging a failure. Therefore, even though the motor current detection device is normal, the failure judging device misjudges that the motor current detection device has failed.

The cause of drop down of the motor supply voltage may not be that an oxide film is formed on the contact surface between the commutator and brush of the motor. It is conceivable that the resistance of a wire harness between the motor and a control unit increases, the resistance is increased by the dislocation of contact between the commutator and brush of the motor, an oxide film is formed on the contact point of a relay when the motor relay is interposed between the motor and the battery, or foreign substance adheres to the contact point of the motor relay besides a case where the power supply voltage (battery voltage) drops for some reason or other. The present invention is aimed to solve the above problems.

BRIEF SUMMARY OF THE INVENTION

It is the principal object of the present invention to provide an electric power steering device comprising a control unit capable of distinguishing a failure of a motor current detection device caused by a change in power supply voltage, an oxide film formed on the commutator of a motor or the contact point of a motor relay, etc. from a failure of the motor current detection device itself and judging a failure of the motor current detection device accurately.

It is another object of the present invention to provide an electric power steering device comprising a control unit which compensates for a change in the power supply voltage and compares a motor current detection value sampled for a time during which a predetermined constant voltage is supplied with a motor current estimated value to judge a failure of the motor current detection device.

It is still another object of the present invention to provide an electric power steering device comprising a control unit which judges a failure of the motor current detection device based on the results of a plurality of failure detections.

It is a further object of the present invention to provide an electric power steering device comprising a control unit having a fail-safe processor for cutting off power supply to the motor from a power source when a failure of the motor current detection device is determined.

Other objects of the present invention will become apparent from the following detailed description when taken in conjunction with the accompanying drawings.

DETAILED DESCRIPTION OF THE INVENTION

Figure 1:
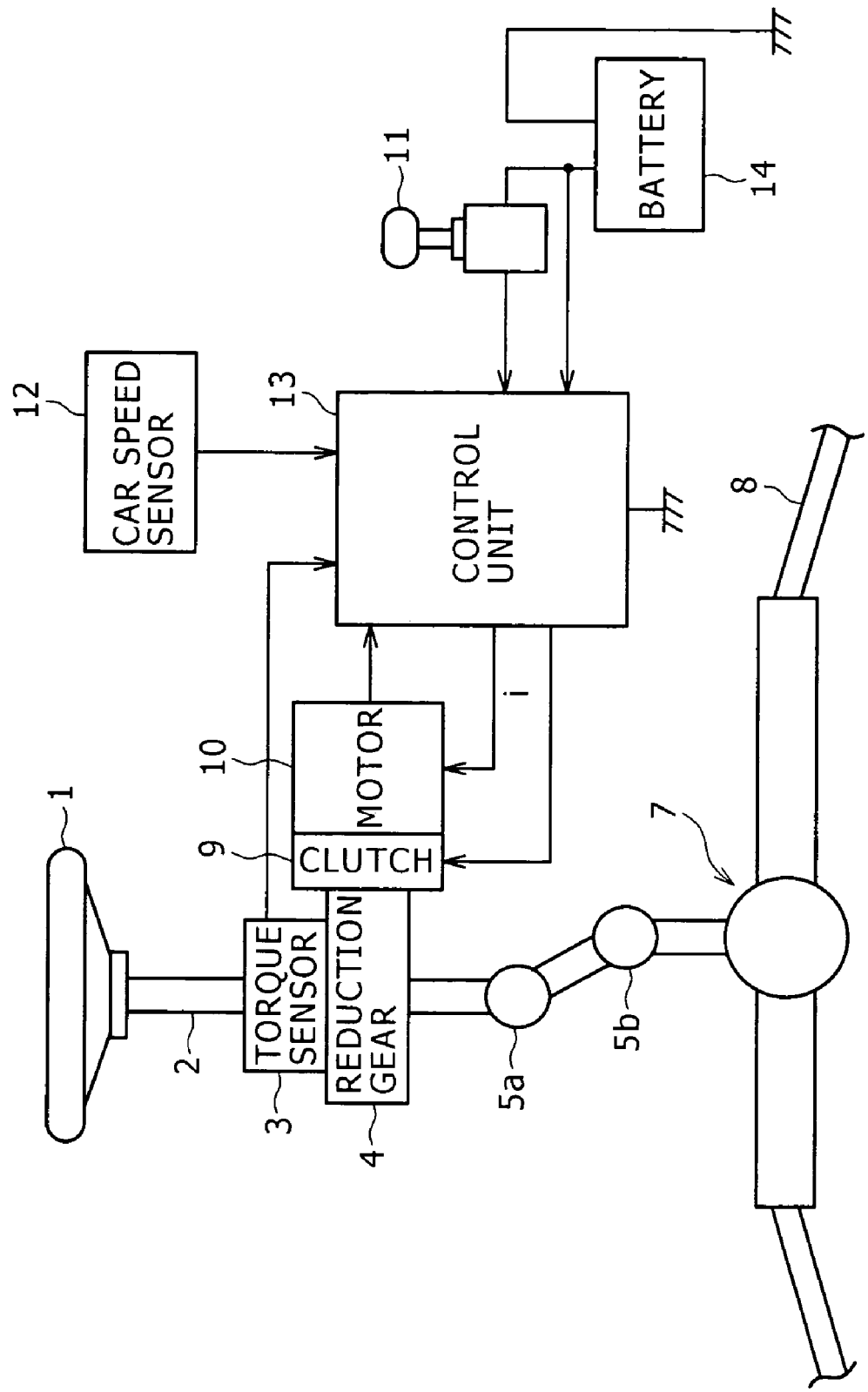
FIG. 1 is a schematic diagram showing the constitution of an electric power steering device.

A preferred embodiment of the present invention will be described hereinunder. FIG. 1 is a diagram schematically showing the constitution of an electric power steering device suitable for carrying out the present invention. The shaft 2 of a steering wheel 1 is connected to the tie rod 8 of a steering mechanism through a reduction gear 4, universal joints 5a and 5b and a pinion rack mechanism 7. The shaft 2 is fitted with a torque sensor 3 for detecting the steering torque of the steering wheel 1, and a motor 10 for assisting steering force is connected to the shaft 2 through a clutch 9 and the reduction gear 4.

An ignition key signal is supplied to an electronic control unit 13 for controlling the power steering device from a battery 14 through an ignition key 11, and power is supplied to the electronic control unit 13 from parallel power lines. The electronic control unit 13 calculates a current command value based on steering torque detected by the torque sensor 3 and the car speed is detected by a car speed sensor 12 to control a current "i" to be supplied to the motor based on the calculated current command value.

The clutch 9 is controlled by the electronic control unit 13. The clutch 9 is connected in a normal operation state and disconnected when the electronic control unit 13 judges that the power steering device fails and when the power is turned off. Other embodiments do not include clutch 9.

Figure 2:
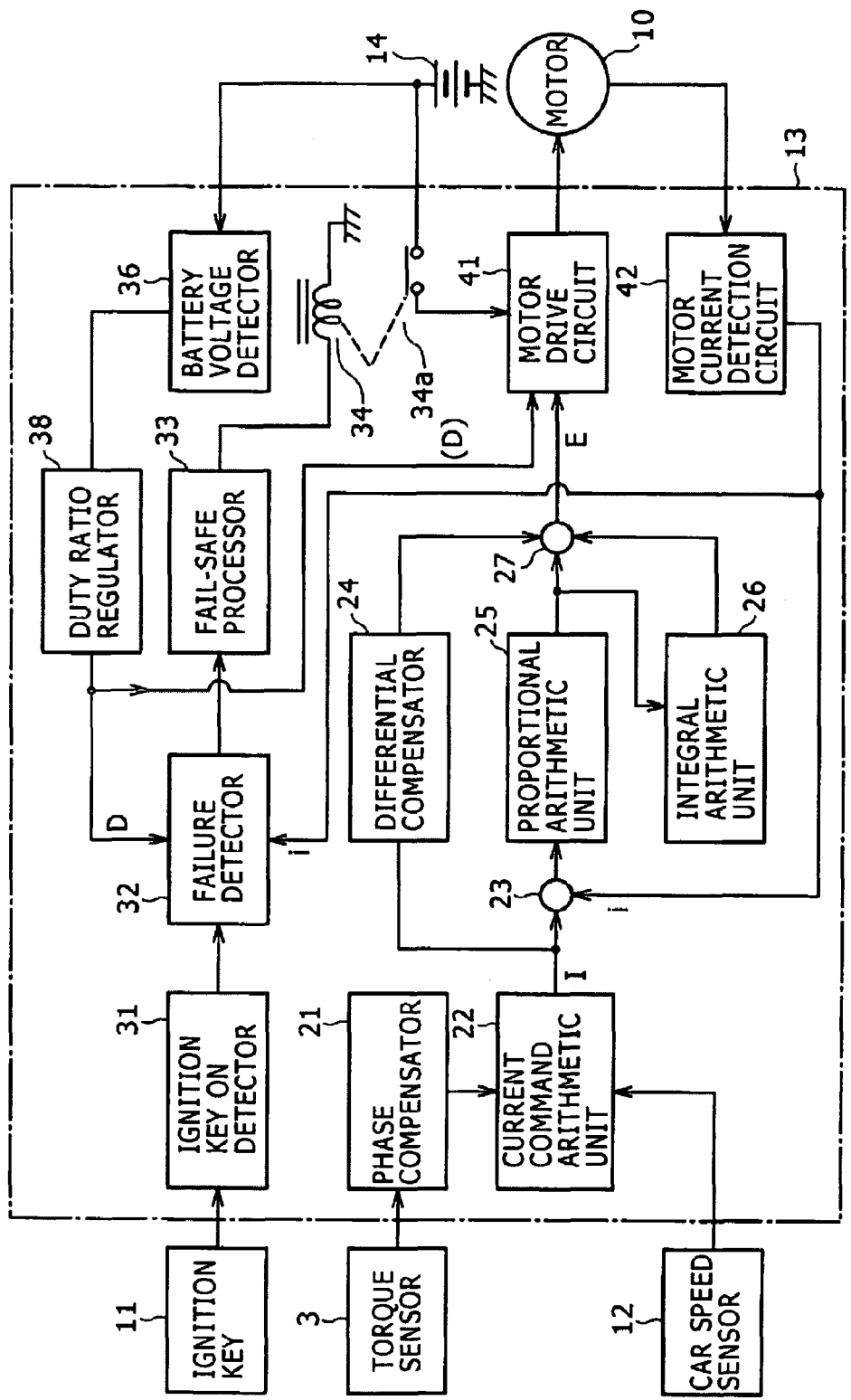
FIG. 2 is a block diagram of an electronic control unit according to an embodiment of the present invention.

FIG. 2 is a block diagram of the electronic control unit 13. In this embodiment, the electronic control unit 13 is mainly composed of a CPU, and functions executed by programs stored in the CPU are shown in the figure. For example, a phase compensator 21 is not independent hardware, but rather a phase compensation function to be executed by the CPU. It is needless to say that the electronic control unit 13 is not necessarily composed of a CPU. Its function elements can be composed of independent hardware (electronic circuits).

A description is subsequently given of the function and operation of the electronic control unit 13. A steering torque signal input from the torque sensor 3 is phase compensated by the phase compensator 21 in order to improve the stability of the steering system. The phase compensation is supplied to a current command arithmetic unit 22. The car speed detected by the car speed sensor 12 is also supplied to the current command arithmetic unit 22.

The current command arithmetic unit 22 determines a current command value "I" which is a current command value to be supplied to the motor 10 by a predetermined expression based on the torque signal and car speed signal.

A circuit composed of a comparator 23, a differential compensator 24, a proportional arithmetic unit 25 and an integral arithmetic unit 26 is a circuit for carrying out feed-back control so that the motor current detection value "i" becomes the current command value "I".

The proportional arithmetic unit 25 outputs a value proportional to the difference between the current command value "I" and the motor current detection value "i". Further, the output signal of the proportional arithmetic unit 25 is integrated by the integral arithmetic unit 26 to improve the characteristics of a feed-back system, and a value proportional to the integrated value of the difference is output.

The differential compensator 24 outputs a differential value of the current command value "I" in order to improve the response speed of the motor current actually flowing through the motor to the current command value "I" calculated by the current command arithmetic unit 22.

The differential value of the current command value "I" output from the differential compensator 24, the proportional value proportional to the difference between the current command value and the actual motor current output from the proportional arithmetic unit 25 and the integrated value output from the integral arithmetic unit 26 are added up by an adder 27, and a motor current control value E which is the result of the above addition is supplied to a motor drive circuit 41 as a motor drive signal.

The detection of a failure of the motor current detection circuit 42 and the constitution and operation of fail-safe processing based on the detection result will be described in detail later.

Figure 3:
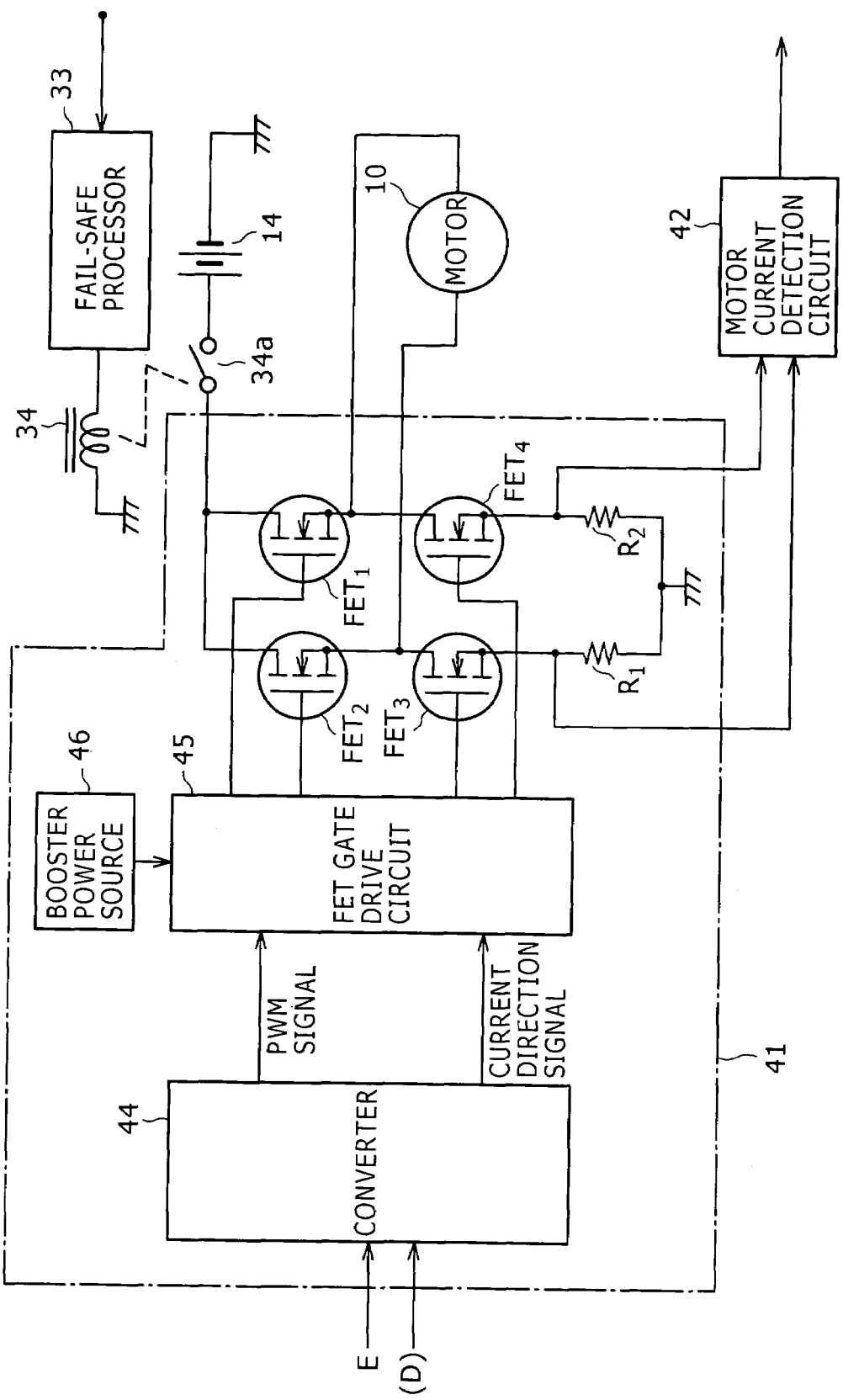
FIG. 3 is a block diagram showing an example of a motor drive circuit.

FIG. 3 shows an example of the motor drive circuit 41. The motor drive circuit 41 comprises a converter 44 for separating and converting a motor current control value E from the adder 27 into a PWM signal and a current direction signal, FET1 to FET4 and an FET gate drive circuit 45 for opening or closing the gates thereof. A booster power source 46 drives the high sides of the FET1 and FET2.

The PWM signal (pulse width modulation signal) is a signal for driving the gates of H bridge interlinked FET (field effect transistor) switching devices FET1 and FET2, and the duty ratio D (ON/OFF time ratio of the gates of FET's) of the PWM signal is determined by the absolute value of the motor current control value E calculated by the adder 27.

Although the duty ratio D is determined based on the calculated motor current control value E as described above in a normal running state, when the ignition key is turned on, the motor current control value E is preset for detecting a failure. That is, the duty ratio D of the PWM signal is adjusted according to a battery voltage VBA at that point. This will be described in detail later.

The current direction signal is a signal indicative of the direction of a current to be supplied to the motor and determined by the sign (positive or negative) of the motor current control value E calculated by the adder 27.

FET1 and FET2 are switching devices whose gates are turned on or off based on the duty ratio of the PWM signal and which are used to control the level of motor current. FET3 and FET4 are switching devices whose gates are turned on or off based on the current direction signal (when one of the gates of the switching devices is turned on, another gate is turned off) and which are used to change the direction of motor current, that is, the rotation direction of the motor.

When FET3 is conductive, motor current flows through FET1, the motor 10, FET3 and a resistor R1. Thus, a positive-direction current flows through the motor 10. When FET4 is conductive, a current flows through FET2, the motor 10, FET4 and a resistor R2. Thus, a negative-direction current flows through the motor 10.

The motor current detection circuit 42 detects the size of the positive-direction current based on a voltage drop at the resistor R1 and the negative-direction current based on a voltage drop at both ends of the resistor R2. The detected actual motor current values are fed back to the comparator 23 (see FIG. 2).

The above-described electronic control unit sets the current command value "I" to a large value when the detected steering torque generated by the operation of the steering wheel is large, and the detected car speed is zero or low and to a small value when the detected steering torque is small or the detected car speed is high. Therefore, the optimum steering assist force can be provided according to a running state of the vehicle.

A description is subsequently given of the detection of a failure of the motor current detection device and fail-safe processing based on the detection result according to an embodiment of the present invention.

In this embodiment of the present invention, a failure of the motor current detection device is detected by comparing a motor current detection value "i" with a motor current estimated value "is" while the motor does not rotate substantially, even when supplying voltage between the terminals of the motor. A description is first given of setting a condition where the motor does not rotate substantially and the motor current detection value "i" and the motor current estimated value "is" in this condition.

When the ignition key 11 is turned on to supply a voltage (may be referred to as "motor voltage" hereinafter) V between the terminals of the motor, the following relationship (1) is established between a motor voltage V and a motor current "i" through the motor.

$$V = L \cdot di/dt + Ri + k_T \omega \quad (1)$$

wherein V is motor supply voltage (a voltage between the terminals of the motor), $k_T$ is the counter-electromotive force, which is a constant of the motor, "ω" is the angular velocity of the motor, L is the inductance of the motor, and R is resistance between the terminals of the motor.

The mechanical time constant Tm of the motor is a value obtained by dividing the inertia moment J of the motor by the viscous resistance B of the motor and represented by Tm=J/B, and the electric time constant Te of the motor is a value obtained by dividing the inductance L of the motor by the resistance R of the motor and represented by Te=L/R.

The transient characteristics of the motor current "i" and the motor angular velocity "ω" and the timing of sampling a motor current during a predetermined time T, which is set to a value much smaller than the mechanical time constant Tm of the motor and larger than the electric time constant Te of the motor (Te<T<<Tm), and a voltage V, which is supplied to the motor from the initial state for the predetermined time T, will be described with reference to FIGS. 4(a) to 4(d).

Figure 4A:
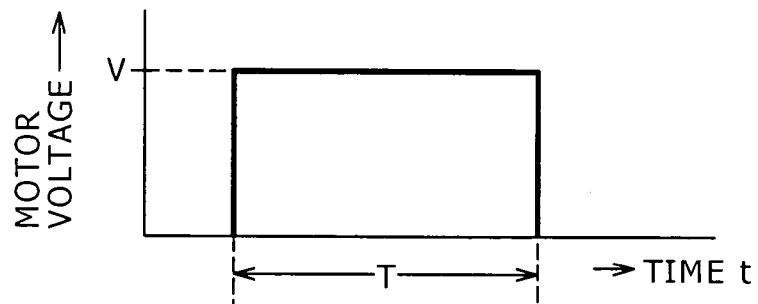
FIGS. 4(a) to 4(d) are diagrams showing the transient characteristics of a motor current "i" and a motor angular velocity "ω" and the sampling timing of the motor current "i"

That is, FIG. 4(a) shows the relationship between motor voltage V and time. A constant voltage V is supplied to the motor for the predetermined time T. When the battery voltage VBA drops for some reason or other, a predetermined current does not flow through the motor, thereby making it possible to misjudge whether the motor current detection circuit 42 has failed. Consequently, the power supply voltage (battery voltage) VBA just before the motor is driven is detected, and the duty ratio D of the PWM signal is adjusted according to the detected battery voltage VBA so that the constant voltage V is supplied to the motor regardless of the level of the battery voltage VBA. This will be described in detail hereinafter.

Figure 4B:
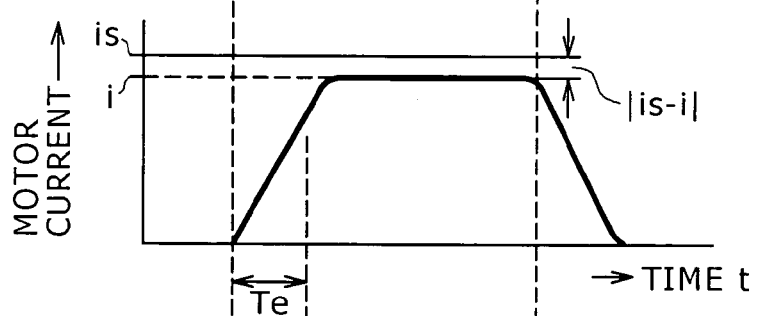

FIG. 4(b) shows the relationship between motor current and time. When the voltage V is supplied to the motor, a motor current rises relatively quickly (before time Te elapses) (Te<T) and a constant motor current "i" flows. "is" represents a motor current estimated value which will be described hereinafter.

Figure 4C:
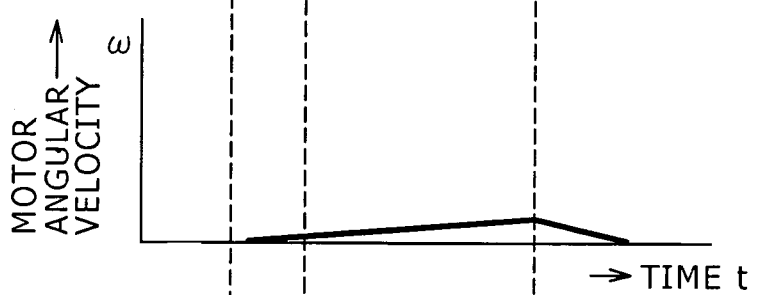

FIG. 4(c) shows the relationship between the angular velocity "ω" of the motor and time. For time T during which the voltage V is supplied to the motor, the mechanical time constant Tm of the motor is large and the angular velocity "ω" of the motor is almost zero, which means that the motor does not rotate. Further, when the motor voltage V is set such that the above motor current estimated value "is" is smaller than a value corresponding to the stationary friction torque of the steering mechanism, the condition under which the motor does not rotate can be perfectly attained.

Figure 4D:
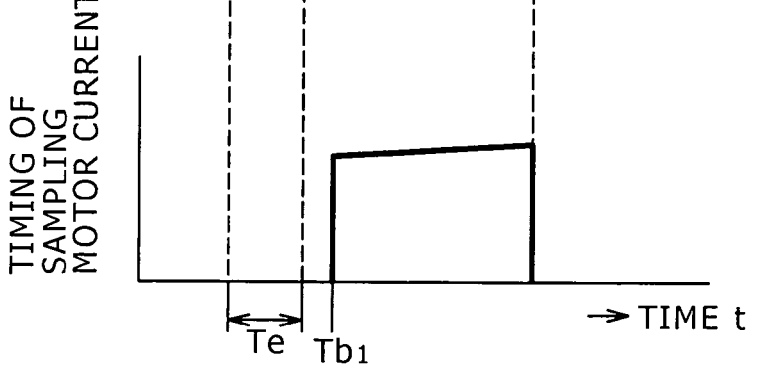

FIG. 4(d) shows the timing of sampling a motor current. Sampling starts from time Tb1 after the motor current is increased by supplying the voltage V to the motor.

According to the transient characteristics of the above constant motor current "i" and the motor angular velocity "ω", when the motor current rises by the application of the voltage V to the motor, a constant current "i" flows through the motor, which rarely rotates the motor at this point, and the differential values of the angular velocity "ω" and the motor current "i" are approximately zero.

Therefore, the above expression (1) can be represented by the following expression (2).

$$V = Ri \quad (2)$$

Therefore, the motor current estimated value "is" can be obtained by dividing the motor voltage V by the internal resistance R of the motor and represented by the following expression (3).

$$is = V/R \quad (3)$$

Since the motor current estimated value "is" does not include terms for the counter-electromotive force $k_T\omega$ and regenerative voltage $L \cdot di/dt$ of the motor, as is obvious from the expression (3), the motor current estimated value "is" can be estimated without being influenced by the counter-electromotive force and regenerative voltage of the motor.

Since the constant voltage V is supplied to the motor regardless of the battery voltage VBA by detecting the battery voltage VBA just before the motor is driven and adjusting the duty ratio D of the PWM signal according to the detected battery voltage VBA as described above, the motor voltage V has the relationship represented by the following expression (4) with the duty ratio D of the PWM signal supplied to the motor.

$$V = VBA \cdot D \quad (4)$$

wherein V is a motor voltage (a voltage between the terminals of the motor), VBA is a battery voltage and D is the duty ratio of the PWM signal.

Therefore, the expression (3) representing the above motor current estimated value "is" can be expressed by the following expression (5).

$$\text{"is"} = (VBA \cdot D)/R \quad (5)$$

A detailed description of the detection of a failure of the motor current detection device is given below. A failure of the motor current detection device occurs in the following cases in addition to a case where the motor current detection device itself fails.

A first case is where the battery voltage suddenly drops for some reason or other, and a predetermined voltage value is not supplied to the motor. Then very low motor current is detected even though the motor current detection device is normal. Thus, it is misjudged that the motor current detection device has failed.

A second case is where no motor current is detected or only very low motor current is detected due to an oxide film formed on the contact surface between the commutator and brush of the motor. Thus, it is misjudged that the motor current detection device has failed.

A third case is where no motor current is detected or only very low motor current is detected due to an increase in resistance caused by the oxidation of wiring between the motor and the motor current detection device, an increase in resistance caused by the oxidation of the contact point of a wiring connector or an increase in resistance by the dislocation of contact between the commutator and brush of the motor. Thus, it is misjudged that the motor current detection device has failed.

A fourth case is where no motor current is detected or only very low motor current is detected due to an oxide film formed on the contact point of a relay or the adhesion of foreign substance to the contact point of the relay when the motor relay is arranged in a circuit for supplying power to the motor from the battery. Thus, it is misjudged that the motor current detection device has failed.

The following measures are taken to carry out the detection of a failure of the motor current detection device accurately in this embodiment of the present invention.

A first measure is to supply the predetermined voltage V to the motor in a stable manner. To this end, the battery voltage VBA just before the motor is driven is detected, and the duty ratio D of the PWM signal is adjusted according to the detected battery voltage VBA (when the battery voltage drops, the duty ratio D is increased) so that the constant voltage V is supplied in a stable manner regardless of the level of the battery voltage VBA. The adjustment of the duty ratio D is carried out each time a failure of the motor current detection device is judged.

A second measure is to carry out the failure detection of the motor current detection device a predetermined number of times (3 times in this embodiment). When it is judged that there is no failure, failure diagnosis is terminated, and when it is judged that a failure occurs after failure diagnosis is repeated a predetermined number of times (3 times in this embodiment), the occurrence of a failure is determined and a fail-safe processing is carried out to terminate failure diagnosis.

Figure 5:
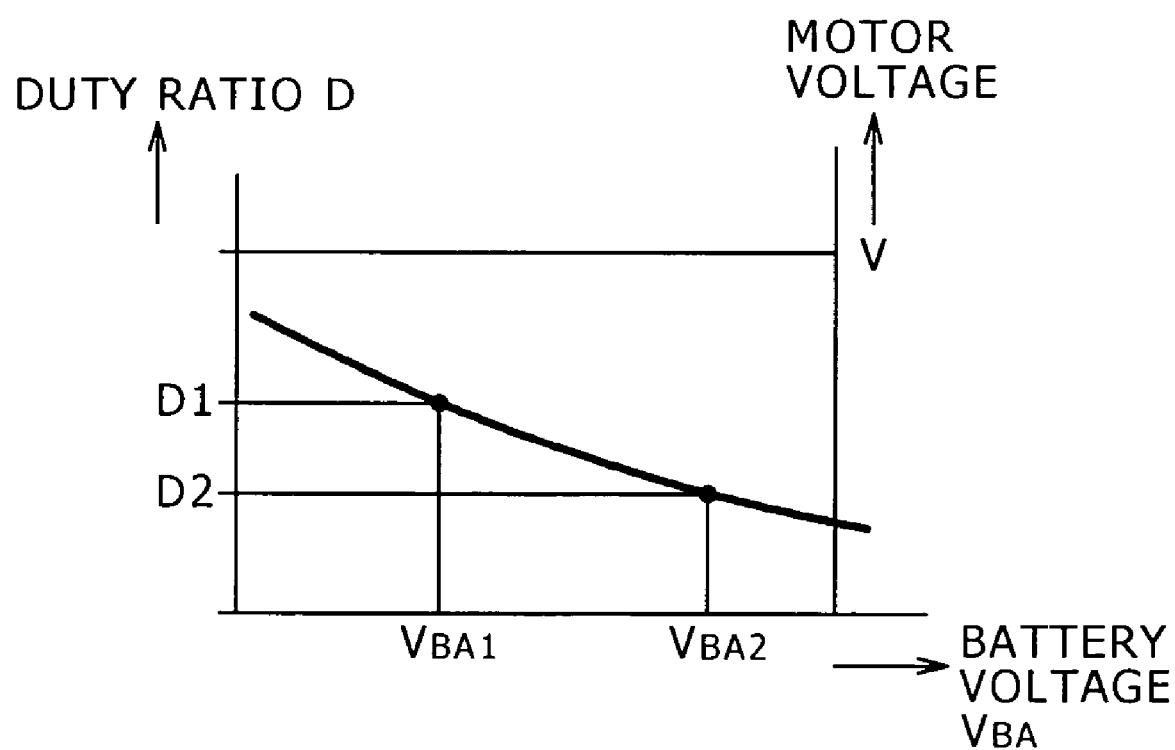
FIG. 5 is a diagram for explaining the relationship among power supply voltage (battery voltage) VBA, duty ratio D of a PWM signal and motor supply voltage V.

A description is first given of the stable supply of the constant voltage V to the motor which is essential to failure detection. FIG. 5 shows the relationship among the battery voltage VBA, the duty ratio D of a PWM signal and the motor voltage V. When the detected battery voltage VBA is VBA1, the duty ratio D is set to D1. Then, the voltage V is supplied to the motor. When the battery voltage VBA is VBA2, the duty ratio D is set to D2. In this case, the voltage V is supplied to the motor.

Thus, the constant voltage V can be stably supplied to the motor regardless of the level and change of the battery voltage VBA by adjusting the duty ratio D according to the detected battery voltage VBA.

Figure 6:
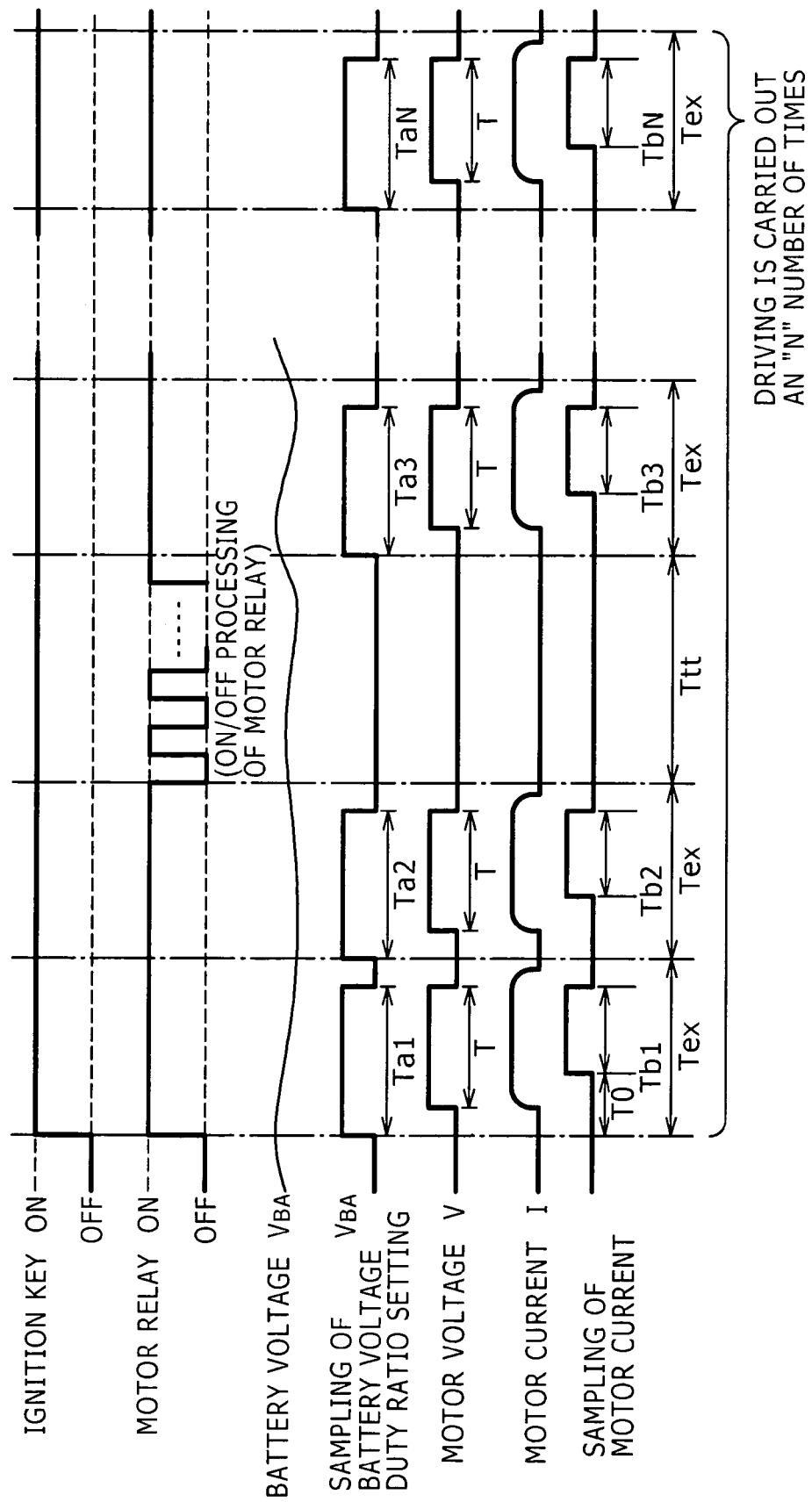
FIG. 6 is a timing chart for explaining the timing of failure detection processing which is carried out at a repetition cycle Tex.

With reference to FIG. 2 and FIG. 6, the detection of a failure by the motor current detection circuit 42 as the motor current detection device and the constitution and operation of fail-safe processing based on the detection result will be described hereinbelow.

Since the failure detection processing is repeated at a predetermined timing, as will be described hereinafter, the timing is controlled by using a plurality of timers set in the inside of the CPU of the electronic control unit 13.

A timer TA controls the longest time TT of the failure detection processing and the timing of removing the oxide film and removing foreign substance (turning on and off the relay).

A timer TB controls the failure detection cycle Tex which is carried out repeatedly. The failure detection cycle Tex is set to a predetermined value much smaller than the mechanical time constant Tm of the motor which has been described hereinabove and equal to or larger than the electric time constant Te of the motor (Te≦Tex<Tm). The failure detection cycle Tex may consist of a first cycle and a second cycle different from the first cycle so that the detection of a failure is first carried out at the first cycle and then at the second cycle after the processing of removing the oxide film formed on the contact point of the relay and removing foreign substance adhered to the contact point (in this embodiment, the first cycle is set to 2 ms and the second cycle is set to 10 ms).

As for the failure detection processing, within the longest time TT which is controlled by the timer TA, it is judged that there is no failure or it is determined that a failure occurs. If the result of failure detection is not determined within the longest time TT, the failure detection processing is terminated and abnormality processing explained later is carried out.

A timer TC controls the timings of starting and terminating the sampling of a battery voltage, the timings of supplying and terminating a motor voltage and the timings of starting and terminating the sampling of a motor current.

When the ignition key 11 is turned on, the motor relay 34 is switched on and a feeder circuit for supplying power to the motor 10 from the battery 14 through the motor drive circuit 41 is closed. The timing of the timer TA is started, and the failure detection processing of the motor current detection circuit 42 is started. The ON signal of the ignition key 11 is detected by an I.G. key ON detector 31, and the detection signal is supplied to a failure detector 32.

The failure detection processing is repeated more than one time at the predetermined failure detection cycle Tex. This will be described hereinafter, and one time of failure detection processing will be described hereinbelow.

When the failure detection processing is started, the sampling of a battery voltage VBA is carried out by a battery voltage detector 36 for a time Ta1, and the sampled battery voltage VBA is supplied to a duty ratio regulator 38. The time Ta1 is set shorter than the above predetermined failure detection cycle Tex.

In the sampling of a battery voltage VBA by the battery voltage detector 36, the battery voltage VBA is monitored, the failure detection processing is suspended when it is detected that the battery voltage VBA is outside the predetermined allowable range, and then the failure detection processing is resumed from the beginning.

The duty ratio regulator 38 adjusts the duty ratio D of the PWM signal which is determined by a motor current control value E preset for the detection of a failure of the motor current detection circuit 42 just after starting the failure detection processing according to the level of the battery voltage VBA and outputs the adjusted duty ratio D. The adjusted duty ratio D of the PWM signal is supplied to the motor drive circuit 41 so that the constant voltage V is supplied to the motor regardless of the level of the battery voltage VBA (see FIG. 4(a)).

The duty ratio regulator 38 operates during the time of failure detection processing controlled by the timer TA and becomes inoperative when it is judged that there is no failure and the vehicle starts running. At the time of running, the motor current control value E output from the adder 27 is supplied to the motor drive circuit 41 to determine the duty ratio D of the PWM signal.

The sampling of a motor current "i" is started from a time Tb1 after the elapse of a predetermined time To (To<T) under the control of the timer TC. The motor current detection value "i", detected by the motor current detection circuit 42, is supplied to the failure detector 32 as a sampled value. The reason that the sampling start time is the time Tb1 after the elapse of the time T0 is that a stable motor current is detected after motor current increases. The point of time when the sampling ends is the same point of time when the application of the voltage V to the motor ends.

The failure detector 32 calculates a motor current estimated value "is" by inserting the adjusted duty ratio D of the PWM signal and resistance R between the terminals of the motor (internal resistance of the motor) into the above expression (5) and compares it with a motor current detection value "i" detected by the above motor current detection circuit 42 as a sampled value. When the absolute value of (is−i) is larger than the predetermined allowable value Δi, it is judged that the motor current detection circuit 42 fails. When the absolute value of (is−i) is equal to or smaller than the predetermined allowable value Δi, it is judged that the motor current detection circuit 42 is normal. Thus, one time of failure detection processing finishes.

Since the internal resistance R of the motor is changed by the temperature of the motor, the motor current estimated value "is" also changes and affects the result of detection on a failure of the motor current detection device. Then, it is recommended that the temperature of the motor should be detected, a temperature compensation value ΔR should be determined based on the detection result, and the internal resistance R of the motor should be corrected. The means of correcting the internal resistance R of the motor is known.

A specific value (fixed value) determined by experiments may also be used as the motor current estimated value "is".

The failure detection processing which is repeated more than one time at the cycle Tex and its timing will be described hereinunder with reference to the timing chart of FIG. 6.

When it is detected that the ignition key 11 is turned on, the count value of a failure detection counter is reset, and the timer TA is reset before the start of the failure detection processing. The timer TB and the timer TC are also reset to start the first failure detection processing.

For a time Ta1, the sampling of a battery voltage is carried out, the duty ratio D of the PWM signal is determined according to the sampled battery voltage VBA, and a constant voltage V determined based on the duty ratio D is output to the motor drive circuit. A constant voltage V is supplied to the motor regardless of the level of the battery voltage, the motor is started, and a motor current "i" flows through the motor (see FIGS. 4(a) and 4(b)).

The sampling of a motor current "i" is started from the time Tb1 within the time T during which the voltage V is supplied to the motor (see FIG. 4(d)). The sampled motor current value "i" is detected by the motor current detection circuit 42 and supplied to the failure detector 32 (failure detection device).

The failure detector 32 calculates a motor current estimated value "is" (see the above expression (5)) and compares it with the motor current detection value "i" detected by the above motor current detection circuit 42 as a sampled value.

Since it is judged that the motor current detection circuit 42 is normal when the absolute value of (is−i) is equal to or smaller than the predetermined allowable value Δi, the failure detection processing of the motor current detection circuit 42 is terminated. When the absolute value of (is−i) is larger than the predetermined allowable value Δi, it is judged that the motor current detection circuit 42 fails.

When it is judged that the motor current detection circuit 42 fails, the elapsed time of the failure detection processing measured by the timer TB is compared with the failure detection cycle Tex. When the elapsed time measured by the timer TB reaches or exceeds one failure detection cycle Tex, "1" is added to the count value of the failure detection counter, the timer TB and the timer TC are initialized, and the second failure detection processing is started. When the elapsed time measured by the timer TB does not reach one failure detection cycle Tex, the processing for the sampling of the battery voltage, the determination of the duty ratio D of the PWM signal and the driving of the motor is resumed. That is, when the elapsed time measured by the timer TB does not reach one failure detection cycle Tex, failure detection is carried out repeatedly.

The second failure detection processing is started. The second failure detection processing is the same as the first failure detection processing. The sampling of a battery voltage is carried out, the duty ratio D of the PWM signal is determined according to the sampled battery voltage VBA, and the motor drive circuit 41 is driven based on the determined duty ratio D.

The time during which the predetermined voltage V is supplied to the motor is the same as the time of the first failure detection processing. The sampling of a motor current "i" is started from a time Tb2 within the time during which the constant voltage V is supplied to the motor. The sampled motor current detection value "i" is detected by the motor current detection circuit 42 and supplied to the failure detector 32.

The failure detector 32 calculates a motor current estimated value "is" and compares it with the motor current detection value "i" detected by the above motor current detection circuit 42.

Since it is judged that the motor current detection circuit 42 is normal when the absolute value of (is–i) is equal to or smaller than the predetermined allowable value Δi, the failure detection processing of the motor current detection circuit 42 is terminated. When the absolute value of (is–i) is larger than the predetermined allowable value Δi, it is judged that the motor current detection circuit 42 fails.

When it is judged that the motor current detection circuit 42 fails, the elapsed time of the failure detection processing measured by the timer TB is compared with one failure detection cycle Tex. When the elapsed time measured by the timer TB reaches or exceeds one failure detection cycle Tex, "1" is added to the count value of the failure detection counter to set the count value of the counter to "2". When the elapsed time measured by the timer TB does not reach one failure detection cycle Tex, the processing for the sampling of the battery voltage, the determination of the duty ratio D of the PWM signal and the driving of the motor is resumed. Failure detection is carried out repeatedly until the elapsed time measured by the timer TB reaches one failure detection cycle Tex.

The second failure detection processing ends as described above. Since the count value of the failure detection counter is "2", that is, the result of decision that the motor current detection circuit 42 fails has repeated twice (the number of failure detection results is 2 in this embodiment, but it is not limited to 2 and may be arbitrary), the process of removing an oxide film formed on the contact point of the relay or removing foreign substance adhered to the contact point (hereinafter, processing of removing the oxide film, etc.) is carried out. This processing can be carried out by turning off and on the relay repeatedly, and the number of repetitions is not limited to one and may be arbitrary. It is carried out for a time Ttt controlled by the timer TA. As for the processing of removing the oxide film, etc., an example of the processing will be described hereinafter with reference to FIG. 9.

Before the relay is turned off and on, to verify that the relay is turned off and then on after it is turned off surely, a predetermined time (100 ms in this embodiment, this time is determined according to the performance of the relay in use) is provided after the relay is turned off and after the relay is turned on.

Thereafter, the third failure detection processing is carried out. Since the third failure detection processing is the same as the first failure detection processing, a detailed description thereof is omitted. The sampling of a battery voltage is carried out for a time Ta3, and the sampling of a motor current "i" is started at a time Tb3. The failure detector 32 calculates a motor current estimated value "is" (see the above expression (5)) and compares it with a motor current detection value "i" detected by the above motor current detection circuit 42.

Since it is judged that the motor current detection circuit 42 is normal when the absolute value of (is–i) is equal to or smaller than the predetermined allowable value Δi, the failure detection processing of the motor current detection circuit 42 is terminated. When the absolute value of (is–i) is larger than the predetermined allowable value Δi, it is judged that the motor current detection circuit 42 fails.

When it is judged that the motor current detection circuit 42 fails, the elapsed time of the failure detection processing measured by the timer TB is compared with one failure detection cycle Tex. When the elapsed time measured by the timer TB reaches or exceeds one failure detection cycle Tex, "1" is added to the count value of the failure detection counter to set the count value of the counter to "3". When the count value of the failure detection counter becomes "3", a failure of the motor current detection circuit 42 is determined, and the fail-safe processing is carried out. That is, a fail-safe processor 33 is activated, the motor relay 34 is turned off to open the contact point 34a, power supply to the motor 10 is cut off, and the electric power steering device terminates the operation.

When the elapsed time measured by the timer TB does not reach the one failure detection cycle Tex, the processing for the sampling of the battery voltage, the determination of the duty ratio D of the PWM signal and the driving of the motor is resumed, and failure detection is carried out repeatedly until the elapsed time measured by the timer TB reaches one failure detection cycle Tex.

The count value of the failure detection counter is "3" in this embodiment. However, the upper limit of the count value of this counter (failure detection threshold value) is not limited to "3" and may be arbitrary.

Figure 7:
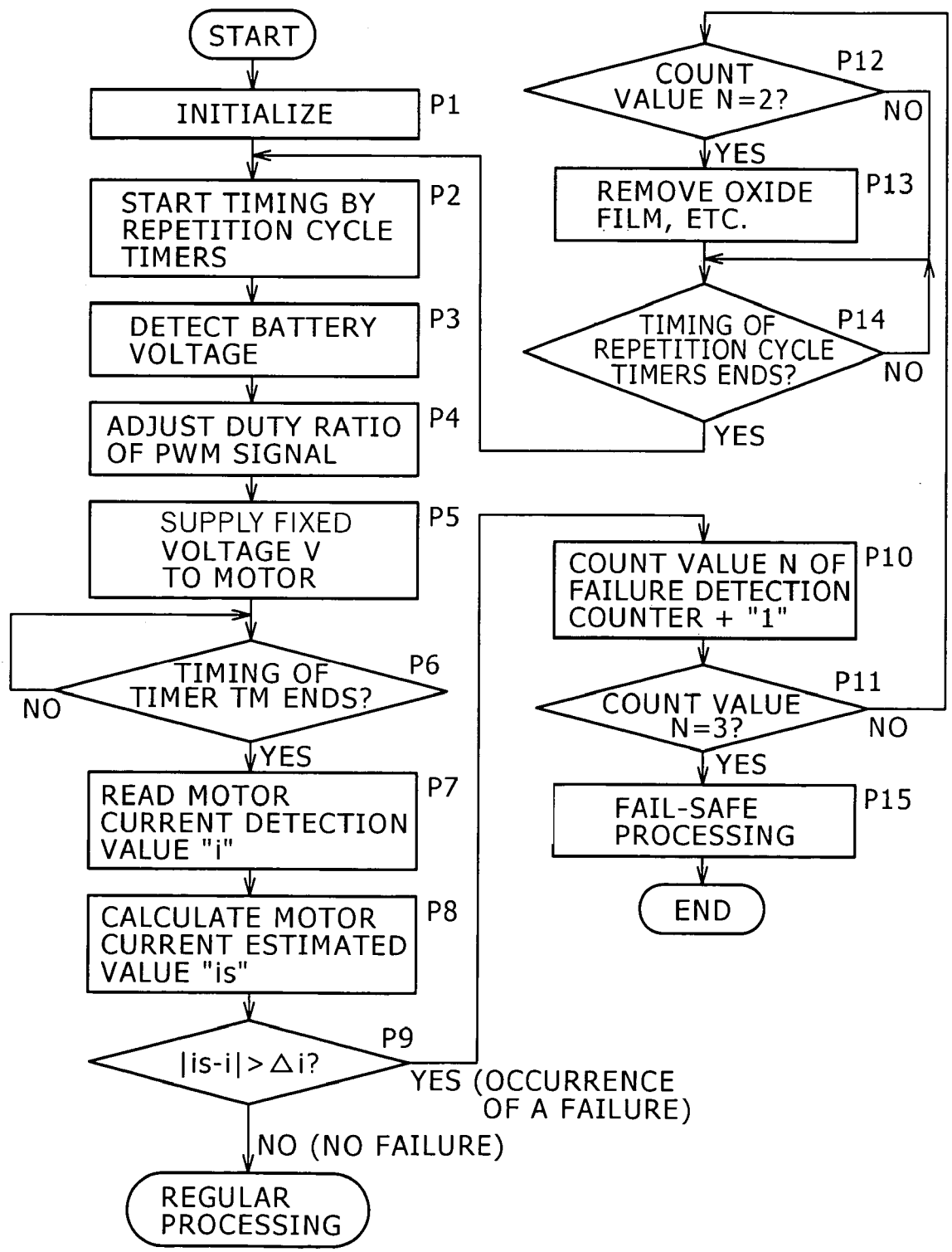
FIG. 7 is a flow chart for explaining a first example of failure detection processing.

FIG. 7 is a flow chart for explaining a first example of the failure detection processing. First of all, the detection processing routine is initialized, the failure detection counter is reset, and the timer TA is reset and starts time counting (step P1). The timer TB and the timer TC are reset and starts time counting (step P2). The voltage value VBA of the battery is detected, and it is judged whether the voltage value VBA of the battery is outside the allowable range (step P3). When it is outside the allowable range, the processing is terminated. When it is within the allowable range, the failure detection processing is continued.

The duty ratio D of the PWM signal is adjusted (step P5). A constant voltage V is supplied to the motor by adjusting the duty ratio D (step P5). The end of timing the predetermined time Tb1 by the timer TM (in FIG. 4(d)) is awaited (step P6), and the sampled motor current detection value "i" is detected by the motor current detection circuit 42 (step P7).

The motor current estimated value "is" is calculated from the above expression (5) (step P8), and it is judged whether the absolute value (is–i) is larger than the predetermined allowable value Δi or not (step P9). When the absolute value is not larger than the predetermined allowable value Δi in step P10, it is judged that there is no failure and the processing is terminated. When the absolute value of (is–i) is larger than the predetermined allowable value Δi in step P9, "1" is added to the count value N of the failure detection counter (step P10).

It is checked if the count value N of the failure detection counter is "3" or not (step P11). When the count value N is not "1", it is checked if the count value N is "2" or not (step P12).

When the count value N is "2" (N=2) in step P12, the process for removing the oxide film, etc. on the contact point of the relay is carried out for the predetermined time Ttt determined by the timer TA which controls the time for carrying out the ON/OFF processing of the motor relay (step P13). When the count value N is not "2" (N=2) in step 12, the control jumps to step 14.

After the end of time counting of repetition cycle timer TB and TC is awaited (step P14), the control returns to step P2 to reset and start time counting of the timer TB and the timer TC and repeat the failure detection processing.

When the count value N is "3" in step P11, whereby the failure of the motor current detection circuit 42 is determined and the fail-safe processing is carried out (step P15) to terminate the failure detection processing.

As for the above-described processing's, the process for removing the oxide film, etc. is carried out when the count value N of the failure detection counter is "2" (N=2) and the process for determining a failure of the motor current detection device is carried out when the count value N of the failure detection counter is "3" (N=3).

However, the process for removing the oxide film, etc. is not carried out only when the count value N of the failure detection counter is "2" and may be carried out when the count value N is 3 or more, less than 2 or other arbitrary numeral. The process for determining a failure of the motor current detection device is not necessarily carried out only when the count value N of the failure detection counter is "3" and may be carried out when the count value N is 4 or more, less than 3 or other arbitrary numeral. In the timing chart of FIG. 6, the process for removing the oxide film, etc. is carried out when the count value N of the failure detection counter is "2", failure detection is repeated an "n" number of times (count value N of the failure detection counter is "n") and then the processing for determining a failure of the motor current detection device is carried out.

Further, the process for removing the oxide film, etc. is not necessarily carried out only after the failure detection processing and may be carried out before the failure detection processing.

Figure 8:
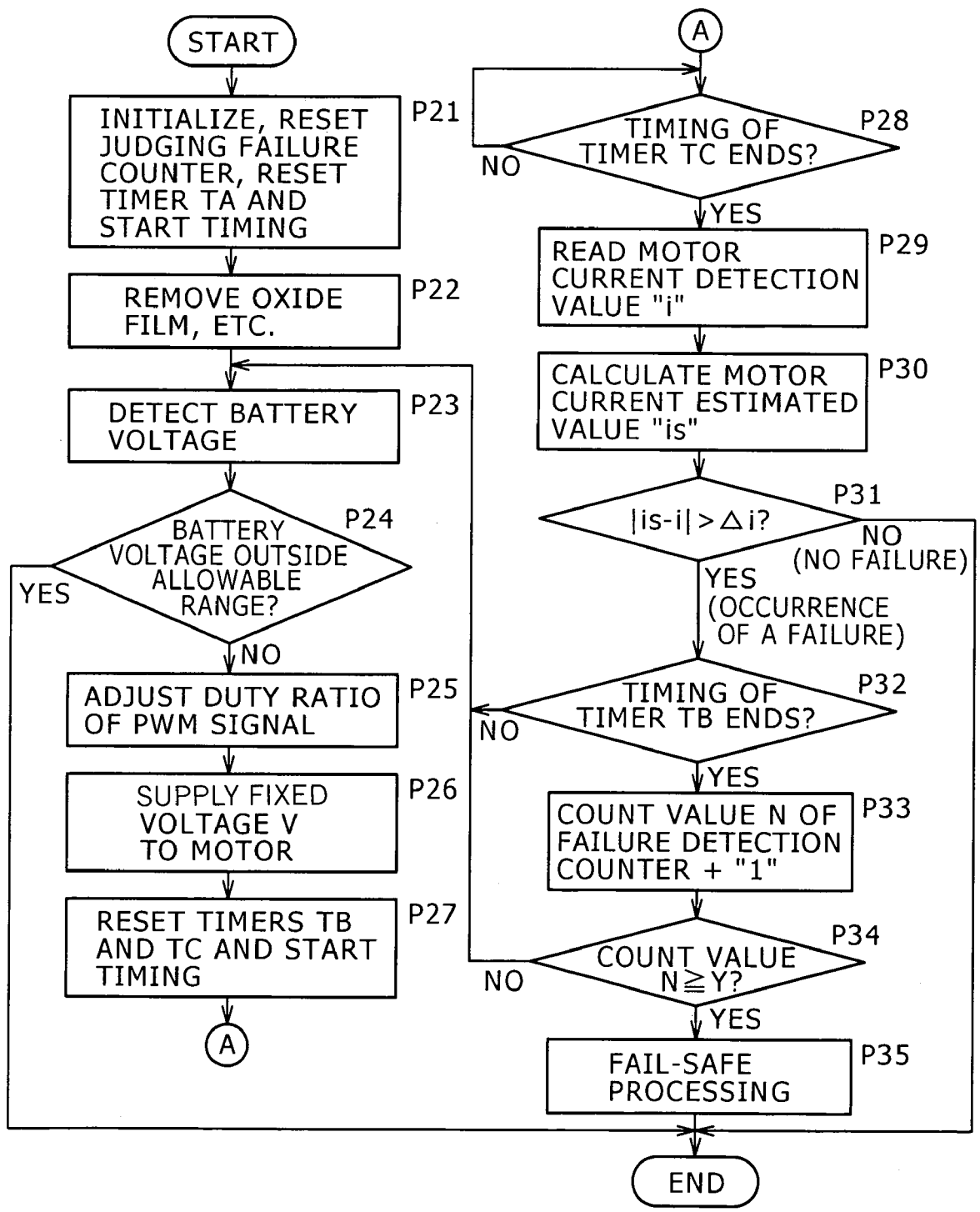
FIG. 8 is a flow chart for explaining a second example of failure detection processing.

FIG. 8 is a flow chart for explaining a second example of the failure detection processing in which the process for removing the oxide film, etc. is carried out before the failure detection processing.

The detection processing routine is initialized, the failure detection counter is reset, and the timer TA is reset and starts time counting (step P21). The process for removing the oxide film formed on the contact point of the relay is carried out for the predetermined time Ttt determined by the timer TA which controls the time during which the process for removing the oxide film, etc. is carried out (step P22), and the voltage value VBA of the battery is detected (step P23). It is judged whether the voltage value VBA of the battery is outside the allowable range or not (step P24). When it is outside the allowable range, the processing is terminated and when it is within the allowable range, the failure detection processing is continued. The duty ratio D of the PWM signal is adjusted (step P25). A constant voltage V is supplied to the motor by adjusting the duty ratio D (step P26).

The timer TB and the timer TC are reset to start time counting (step P27). The end of timing the predetermined time Tb1 by the timer TC (FIG. 4(d)) is awaited (step P28), the sampled motor current detection value "i" is read from the motor current detection device 42 (step P29), the motor current estimated value "is" is calculated by the above expression (5) (step P30), and it is judged whether the absolute value of (is−i) is larger than the predetermined allowable value Δi (step P31).

When the absolute value of Δi is not larger than the predetermined allowable value in step P31, it is judged that there is no failure and the processing is terminated. When the absolute value of (is−i) is larger than the predetermined allowable value Δi, it is judged that a failure occurs. The end of timing of the timer TB is judged, that is, the timing result of the timer TB and one failure detection cycle Tex are compared with each other (step P32). When the timing of the timer TB ends, that is, the timing result of the timer TB reaches one failure detection cycle Tex, "1" is added to the count value N of the failure detection counter (step P33).

When the timing of the timer TB does not end, the control returns to step P23 to repeat the processing after step P23.

It is judged whether the count value N of the failure detection counter reaches or exceeds a predetermined number Y of repetitions for determining a failure, that is, (N≧Y?) (step P34). When (N≧Y), a failure of the motor current detection device 42 is determined, the fail-safe processing is carried out (step P35), and the failure detection processing is terminated. When not (N≧Y) in step P34, the control returns to step P23 to repeat the processing after step P23.

In the timing chart of FIG. 6, an example of the process for removing the oxide film, etc. shown as "ON/OFF processing of relay" (processing of removing the oxide film, etc. formed on the contact point of the relay and removing foreign substance adhered to the contact point) will be described hereinbelow.

The ON/OFF processing of the relay may be carried out while electricity is not supplied or while electricity is supplied. To carry out the ON/OFF processing of the relay while electricity is supplied, the processing is carried out in any one of the following states, and long-term electricity application that causes the motor to rotate should be avoided.

a. When the processing is carried out while electricity is not supplied, the contact point of the relay releases or contacts mechanically, and the mechanical contact properties of the contact point are merely improved. The adhered foreign substance can be removed, but the effectiveness in removing the oxide film, etc. is not so high.

b. When the processing is carried out while electricity is supplied, the contact point of the relay is released or contacted while electricity is supplied. The following operation modes are available, and the effectiveness in removing the oxide film, etc. is higher than when the processing is carried out while electricity is not supplied.

When the operation timing of turning OFF the relay from ON is t-off time and the operation timing of turning ON the relay from OFF is t-on time, there are following three examples.

In Example (1), electricity is supplied when the relay is turned OFF from ON and when the relay is turned ON from OFF.

Electricity is supplied 5 ms before t-off time when the relay is turned OFF from ON and cut off after 5 ms.

Electricity is supplied 5 ms before t-on time when the relay is turned ON from OFF and cut off after 5 ms after.

Figure 9:
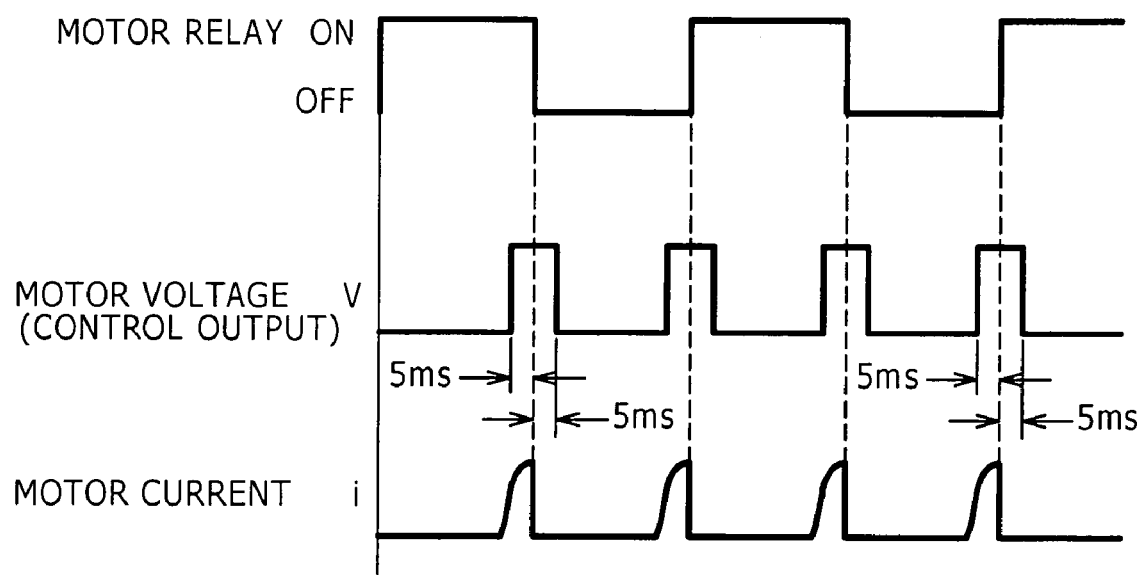
FIG. 9 is a timing chart for explaining an example of the processing of removing an oxide film and foreign substance which are carried out during the failure detection processing.

The timing chart of FIG. 9 shows an enlarged portion represented as "ON/OFF processing of the motor relay" in the timing chart of FIG. 6 and shows the above example (1).

In Example (2), electricity is supplied only when the relay is turned OFF from ON and not supplied when the relay is turned ON from OFF.

Electricity is supplied 5 ms before t-off time when the relay is turned OFF from ON and cut off after 5 ms.

Electricity is not supplied when the relay is turned ON from OFF.

In Example (3), electricity is not supplied when the relay is turned OFF from ON and supplied only when the relay is turned on from off.

Electricity is not supplied when the relay is turned OFF from ON.

Electricity is supplied 5 ms before t-on time when the relay is turned ON from OFF and cut off after 5 ms.

The electricity application time expressed as "electricity is supplied 5 ms before t-off time and cuts off after 5 ms" is given as examples of the time during which electricity is supplied to the relay and not limited to this.

The time during which electricity is supplied to the relay and the use of ON/OFF may be determined according to each unit of the control unit and may be suitably combined when ON/OF control of the relay is carried out a plurality of times with a single control unit.

In the described embodiment of the present invention, when the failure detection processing of the motor current detection device is carried out by the failure detection device, the duty ratio of the PWM signal of the motor drive circuit corresponding to a predetermined motor current command value used for the preset failure detection processing is adjusted according to a power supply voltage detected by the power voltage detection device, and the motor current detection value detected for a time during which a predetermined voltage is supplied to the motor based on the adjusted duty ratio is compared with a motor current estimated value "is" so as to detect a failure of the motor current detection device.

According to this constitution, if the power supply voltage (battery voltage) changes or drops, a constant voltage is supplied to the motor, and a failure of the motor current detection device is judged by comparing a motor current detection value detected for a time during which the constant voltage is supplied with a motor current estimated value, thereby making it possible to prevent misjudgment on a failure of the motor current detection device caused by dropping the motor voltage.

Since the motor current estimated value is estimated based on a power supply voltage value of motor drive circuit and a resistance value obtained by compensating for a change in the internal resistance of the motor caused by the temperature change of the motor, even when the temperature of the motor is high, a failure of the motor current detection device can be always judged accurately. Even when a preset estimated value is used as the motor current estimated value, the above effect can be obtained.

In the described embodiment of the present invention, the processing of detecting a failure of the motor current detection device is carried out a plurality of times at a predetermined cycle. The failure detection processing is terminated when it is judged that there is no failure, and a failure of the motor current detection device is determined when it is judged a predetermined number of times that a failure occurs.

The control unit monitors a power supply voltage while carrying out control operation, suspends the failure detection processing when it is detected that the power supply voltage is outside the allowable range and resumes the failure detection processing from the beginning. Further, when the relay is arranged in the power feed circuit from the power source to the motor, the above control means interrupts the failure detection processing in a case where it is judged a plurality of times that a failure occurs to continue the ON/Off operation of the relay for a predetermined time and then resumes the failure detection processing.

Moreover, when the relay is arranged in the feed circuit from the power source to the motor, the control unit may continue the ONIOFF operation of the relay for the predetermined time and then carry out the above failure detection processing.

According to this constitution, when the power supply voltage changes, when the oxide film is formed on the contact surface between the commutator and brush of the motor, when the resistance of a wire harness between the motor and the control unit increases, when resistance is increased by the gap of contact between the commutator and brush of the motor, when the oxide film is formed on the contact point of the motor relay or when foreign substance adheres to the contact point of the motor relay, misjudgment that the motor current detection device fails can be prevented beforehand, and the failure detection accuracy can be improved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electric power steering device which controls the output of a motor for providing steering assist force to a steering system, comprising:
   a voltage detector for detecting a voltage to be supplied to the motor and a control unit;
   a motor current detection device for detecting a current that flows in said motor; and
   a control unit comprising a failure detector for controlling the output of the motor and detecting a failure of the motor current detection device, wherein
   the failure detection processing of the motor current detection device is carried out by comparing a sampled motor current detection value with a predetermined motor current estimated value during which a predetermined constant voltage is supplied to the motor by adjusting duty ratio of PWM signal of a motor drive circuit corresponding to a predetermined motor current command value used for the failure detection processing.

2. An electric power steering device according to claim 1, wherein the motor current estimated value is based on a motor supply voltage and compensating for a change of motor current internal motor resistance caused by the temperature variation of the motor.

3. An electric power steering device according to claim 1, wherein said motor current estimated value is a predetermined value.

4. An electric power steering device according to claim 1, wherein the control unit carries out the processing of detecting a failure of the motor current detection device a plurality of times at a predetermined repetition cycle, terminates the failure detection processing when it is judged that there is no failure and determines the occurrence of a failure of the motor current detection device when it is detected a predetermined number of times that a failure occurs.

5. An electric power steering device according to claim 1, wherein the control unit monitors the power supply voltage during its control operation, suspends the processing of detecting a failure of the motor current detection device when it is detected that the power supply voltage is outside the allowable range, and resume the failure detection processing from the beginning.

6. An electric power steering device according to claim 4, wherein when a relay circuit is inserted into a feed circuit for supplying electric power to the motor from a power source, the control unit interrupts the failure detection processing and continues the ON/OFF operation of the relay circuit for a predetermined time when it is judged a predetermined number of times that a failure occurs in the processing of detecting a failure of the motor current detection device, and then resumes the failure detection processing.

7. An electric power steering device according to claim 4, wherein the time T during which a predetermined voltage determined based on the adjusted duty ratio is supplied to the motor is a predetermined value much smaller than the mechanical time constant Tm of the motor and equal to or larger than the electric time constant Te of the motor, and the repetition cycle Tex of the processing of detecting a failure of the motor current detection device is equal to or larger than the predetermined time T.

8. An electric power steering device according to claim 4, wherein the control unit determines a motor current from the sampled motor current, and the sampling time of the motor current is shorter than the time T during which the predetermined voltage is supplied to the motor.

9. An electric power steering device according to claim 6, wherein the control unit further comprises a fail-safe processor which activates the relay inserted into the feed circuit for supplying electric power to the motor from the power source to cut off power supply to the motor when a failure of the motor current detection circuit is determined.

10. An electric power steering device according to claim 1, wherein when a relay circuit is inserted into a feed circuit for supplying electric power to the motor from a power source, the control unit continues the ON/OFF operation of the relay circuit for a predetermined time and then carries out failure detection processing.

* * * * *